US011941935B2

(12) United States Patent
Nomura et al.

(10) Patent No.: US 11,941,935 B2
(45) Date of Patent: Mar. 26, 2024

(54) PAPER SHEET PROCESSING DEVICE

(71) Applicant: Glory Ltd., Himeji (JP)

(72) Inventors: Youji Nomura, Himeji (JP); Takashi Tanaike, Himeji (JP)

(73) Assignee: GLORY LTD., Himeji (JP)

(*) Notice: Subject to any disclaimer, the term of this patent is extended or adjusted under 35 U.S.C. 154(b) by 378 days.

(21) Appl. No.: 17/211,842

(22) Filed: Mar. 25, 2021

(65) Prior Publication Data

US 2021/0209887 A1 Jul. 8, 2021

Related U.S. Application Data

(63) Continuation of application No. PCT/JP2019/036204, filed on Sep. 13, 2019.

(30) Foreign Application Priority Data

Sep. 26, 2018 (JP) ................................ 2018-180432

(51) Int. Cl.
*G07D 11/40* (2019.01)
*G07D 11/60* (2019.01)
*G07F 19/00* (2006.01)

(52) U.S. Cl.
CPC ............. *G07D 11/40* (2019.01); *G07D 11/60* (2019.01); *G07F 19/205* (2013.01); *B65H 2402/44* (2013.01)

(58) Field of Classification Search
CPC .... G06F 1/1624; G06F 1/1656; G06F 1/1675; A47B 21/06; G07D 11/40; G07D 11/60; G07D 11/10; G07F 19/205
See application file for complete search history.

(56) References Cited

U.S. PATENT DOCUMENTS

| | | | | |
|---|---|---|---|---|
| 5,931,103 | A * | 8/1999 | Huang | A47B 21/00 108/26 |
| 2006/0021781 | A1* | 2/2006 | Tsubaki | H02G 11/00 174/72 A |
| 2008/0266784 | A1* | 10/2008 | Miyamoto | G06F 1/1616 361/679.4 |

(Continued)

FOREIGN PATENT DOCUMENTS

| | | | |
|---|---|---|---|
| CN | 207008769 | U | 2/2018 |
| JP | 60-167549 | U | 11/1985 |

(Continued)

OTHER PUBLICATIONS

International Search Report and Written Opinion dated Oct. 15, 2019, received for PCT Application PCT/JP2019/036204, Filed on Sep. 13, 2019, 9 pages including English Translation.

*Primary Examiner* — Jeffrey A Shapiro
(74) *Attorney, Agent, or Firm* — XSENSUS LLP

(57) ABSTRACT

A paper sheet processing device includes a housing, a control board disposed in the housing, and at least one conductive wire having a first end connected to the control board. The housing includes a first side wall and a second side wall connected to both ends of a bottom. At least one hole is provided at at least one of the first side wall and the second side wall so as to penetrate therethrough from inside of the housing to outside thereof. The hole allows a second end of the wire to extend from inside of the housing to outside thereof.

11 Claims, 11 Drawing Sheets

(56) References Cited

U.S. PATENT DOCUMENTS

| | | | | |
|---|---|---|---|---|
| 2009/0245743 | A1* | 10/2009 | Cote | G02B 6/4454 385/135 |
| 2011/0188224 | A1* | 8/2011 | Sugai | G06F 1/1656 174/541 |
| 2013/0003317 | A1* | 1/2013 | Gong | H01R 13/72 361/826 |
| 2014/0027241 | A1 | 1/2014 | Sakamoto | |
| 2017/0076269 | A1* | 3/2017 | Saeed | G07G 1/0018 |
| 2018/0224200 | A1* | 8/2018 | Haltmeyer | A47B 88/49 |
| 2018/0350199 | A1 | 12/2018 | Keda | |

FOREIGN PATENT DOCUMENTS

| | | | |
|---|---|---|---|
| JP | H5-13766 | U | 2/1993 |
| JP | 2014-44656 | A | 3/2014 |
| JP | 2016-126416 | A | 7/2016 |
| JP | 2017-107550 | A | 6/2017 |
| WO | 2009/102123 | A2 | 8/2009 |

* cited by examiner

PAPER SHEET PROCESSING DEVICE

CROSS-REFERENCE TO RELATED APPLICATIONS

The present application is a continuation of and claims priority to PCT/JP2019/036204, filed Sep. 13, 2019, which claims priority to JP 2018-180432, filed Sep. 26, 2018, the entire contents of each are incorporated herein by its reference.

BACKGROUND

Field

The present disclosure relates to a paper sheet processing device.

Description of the Background Art

To date, a banknote handling device as disclosed in, for example, Japanese Laid-Open Patent Publication No. 2014-44656 has been suggested as a paper sheet processing device for handling sheets such as banknotes and valuable mediums.

Specifically, Japanese Laid-Open Patent Publication No. 2014-44656 discloses a banknote handling device that includes a protective housing that serves as a safe unit, a banknote storage unit that is disposed in the protective housing and has a storage module for storing banknotes, and second firmware having a control program incorporated therein for controlling driving of the storage module.

SUMMARY

The present disclosure includes: a housing of the paper sheet processing device; a control board disposed in the housing for controlling an operation of the paper sheet processing device; and at least one conductive wire having a first end connected to the control board. The housing includes a bottom, and a first side wall and a second side wall connected to both ends of the bottom. At least one hole is provided at at least one of the first side wall and the second side wall so as to penetrate therethrough from inside of the housing to outside of the housing. The hole allows a second end of the wire to extend from inside of the housing to outside of the housing.

DETAILED DESCRIPTION

Figure 1:
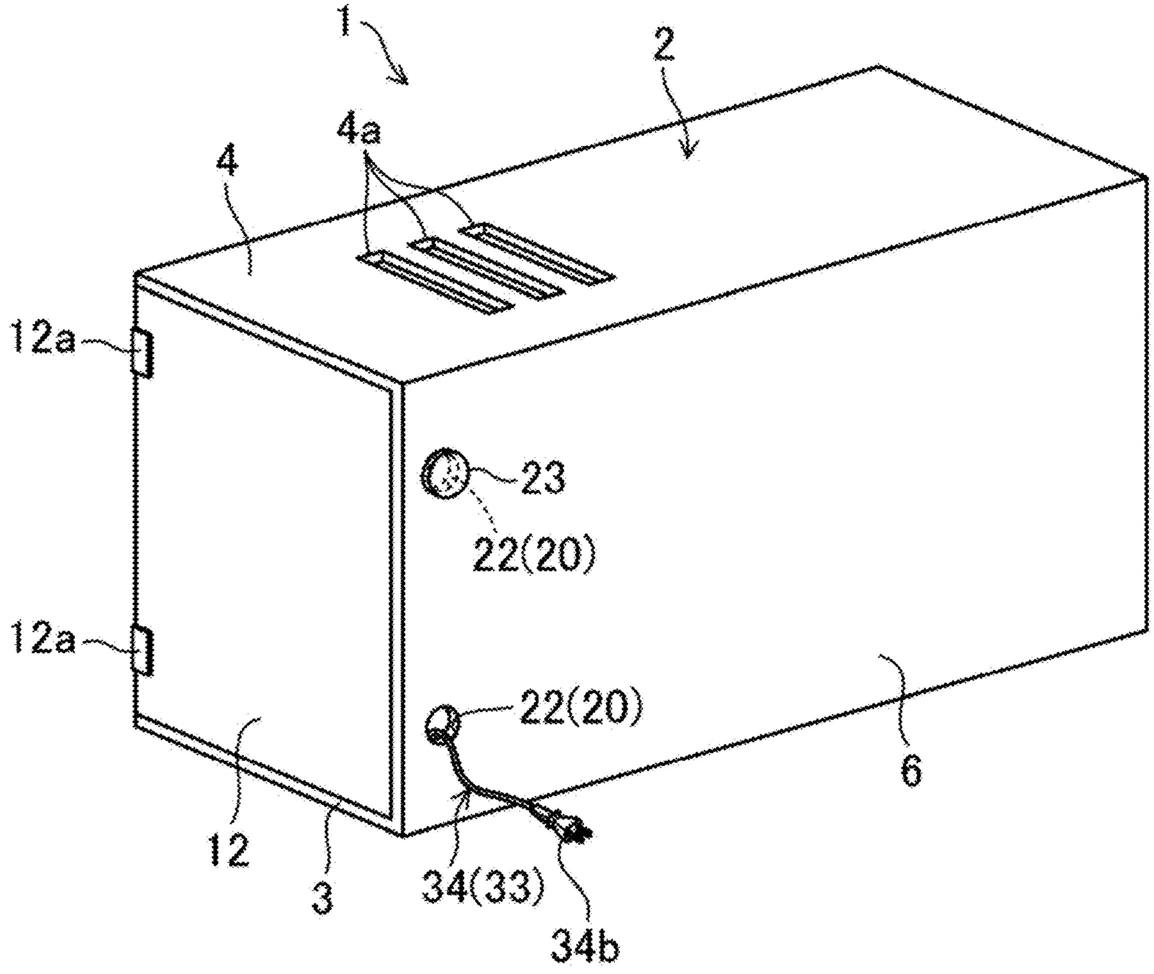
FIG. 1 is an overall perspective view of the entirety of a paper sheet processing device according to an embodiment.

Embodiments of the present disclosure will be described below in detail with reference to the drawings. The following description of the embodiments is intrinsically illustrative, and is not intended to limit the present disclosure, the application thereof, or the usage thereof.

The banknote handling device disclosed in Japanese Laid-Open Patent Publication No. 2014-44656 is assumed to have a configuration (hereinafter, referred to as "conventional configuration") in which, for example, a wire such as a power supply line or a communication line which has electric conductivity and is electrically connected to the second firmware is extended to outside of the device from the rear surface side of the protective housing in order to connect the wire to an external device.

However, in the above-described conventional configuration, in a case where, for example, the banknote handling device is installed in a state where a gap is very small between the rear surface of the protective housing and a wall surface of a room in a building, it is difficult to extend the wire to outside of the device from the rear surface side of the protective housing. Furthermore, in a case where, for example, the banknote handling device is installed under a desk in a state where a working space under the desk is very small, the wire is not easily extended to outside of the device from the rear surface side of the protective housing. Moreover, in a case where, for example, another wire is additionally wired in order to additionally dispose an external device during maintenance after the banknote handling device has been installed, only an option of extending the wire to outside of the device from the rear surface side of the protective housing is allowed in the above-described conventional configuration, so that the wiring work and a work for adding the external device may become complicated.

Thus, in the above-described conventional configuration, the wiring work efficiency may be degraded depending on an environment or a state in which the paper sheet processing device is installed.

The present disclosure has been made in view of such circumstances, and an object of the present disclosure is to enhance wiring work efficiency regardless of an environment or a state in which a paper sheet processing device is installed.

In order to attain the aforementioned object, a paper sheet processing device according to a first aspect includes: a housing of the paper sheet processing device; a control board disposed in the housing for controlling an operation of the paper sheet processing device; and at least one conductive wire having a first end connected to the control board. The housing includes a bottom, and a first side wall and a second side wall connected to both ends of the bottom. At least one hole is provided at at least one of the first side wall and the second side wall so as to penetrate therethrough from inside of the housing to outside of the housing. The hole allows a second end of the wire to extend from inside of the housing to outside of the housing.

In the first aspect, the second end of each wire connected to the control board can be extended from the side surface of the housing to outside of the housing through the hole disposed at at least one of the first side wall and the second side wall. Therefore, in a case where, for example, the paper sheet processing device is installed in a state where a gap is very small between the back surface of the housing and a wall surface of a room in a building, the second end of the wire is easily extended from the side surface of the housing to outside of the housing through the hole. Furthermore, also in a case where, for example, the paper sheet processing device is installed under a desk in a state where a working space under the desk is very small, since the second end of the wire is extended from the side surface of the housing to outside of the housing, the wiring work is facilitated. Furthermore, also in a case where, for example, another wire is additionally wired in order to additionally dispose an external device during maintenance after the paper sheet processing device has been installed, since at least one option for extending the second end of the wire to outside of the device is provided, the wiring work and a work for adding the external device are facilitated, according to the first aspect. Therefore, according to the first aspect, the wiring work efficiency can be enhanced regardless of an environment or a state in which the paper sheet processing device is installed.

According to a second aspect based on the first aspect, the hole may include at least one first hole disposed at the first side wall, and at least one second hole disposed at the second side wall. The wire may include a power supply line having a first end connected to the control board. The wire may include a communication line having a first end connected to the control board. A second end of the power supply line may be extended to outside of the housing through one of the at least one first hole and the at least one second hole. A second end of the communication line may be extended to outside of the housing through one of the at least one first hole and the at least one second hole.

In the second aspect, a plurality of options for extending each of the second end of the power supply line and the second end of the communication line to outside of the device are provided. Therefore, the wiring work efficiency can be further enhanced regardless of an environment or a state in which the paper sheet processing device is installed.

According to a third aspect based on the second aspect, the second end of the power supply line may be extended to outside of the housing through one of the at least one first hole and the at least one second hole. The second end of the communication line may be extended to outside of the housing through the first hole or the second hole through which the power supply line passes.

In the third aspect, the power supply line and the communication line connected to the control board are collected into one and extended to outside of the housing through either the first hole or the second hole. Thus, the wiring work for the power supply line and the communication line can be simplified.

According to a fourth aspect based on the second aspect, the second end of the power supply line may be extended to outside of the housing through one of the at least one first hole and the at least one second hole. The second end of the communication line may be extended to outside of the housing through the first hole or the second hole through which the power supply line does not pass.

In the fourth aspect, the power supply line and the communication line are each extended to outside of the housing through the first hole or the second hole in a separated state. Thus, the power supply line and the communication line can be wired so as to be separated from each other. As a result, the power supply line and the communication line are unlikely to exert electrical influence on each other, thereby inhibiting noise from causing communication error or the like.

According to a fifth aspect based on the second aspect, the first hole may include a plurality of first holes. The plurality of first holes may be spaced from each other in an up-down direction of the first side wall.

In the fifth aspect, the power supply line and the communication line connected to the control board can be each extended to outside of the housing through one of the plurality of first holes disposed at the first side wall. Thus, the number of options for extending the second end of each of the power supply line and the communication line to outside of the device is further increased. The plurality of first holes are spaced from each other in the up-down direction of the first side wall. Therefore, the second end of the power supply line and the second end of the communication line can be extended to outside of the housing through the first holes in a separated state. Thus, the power supply line and the communication line are unlikely to exert electrical influence on each other, thereby inhibiting noise from causing communication error or the like.

According to a sixth aspect based on the fifth aspect, the second hole may include a plurality of second holes. The plurality of second holes may be spaced from each other in an up-down direction of the second side wall.

In the sixth aspect, the power supply line and the communication line connected to the control board can be each extended to outside of the housing through one of the plurality of second holes disposed at the second side wall. Thus, the number of options for extending the second end of each of the power supply line and the communication line to outside of the device is further increased. The plurality of second holes are spaced from each other in the up-down direction of the second side wall. Therefore, the second end of the power supply line and the second end of the communication line can be extended to outside of the housing through the second holes in a separated state. Thus, the power supply line and the communication line are unlikely to exert electrical influence on each other, thereby inhibiting noise from causing communication error or the like.

According to a seventh aspect based on the first aspect, a cap for closing the hole through which the wire does not pass, among the holes disposed at at least one of the first side wall and the second side wall, may be further provided.

In the seventh aspect, the hole through which the wire does not pass is closed by the cap, whereby the housing can be nearly sealed. Thus, a stored state of sheets in the housing can be maintained good. In a case where the hole through which the wire does not pass is closed by the cap, degradation in the design of the outer appearance of the paper sheet processing device can be prevented.

According to an eighth aspect based on the first aspect, the bottom may have an inner bottom facing inside of the housing. The inner bottom may have a groove portion extending between the first side wall and the second side wall. The wire may be disposed so as to be stored at the groove portion.

In the eighth aspect, since the wire is disposed so as to be stored at the groove portion, also in a case where the wire is wired so as to extend between the first side wall and the second side wall, the wire can be stored neatly in the housing.

According to a ninth aspect based on the eighth aspect, a cover for covering the wire stored at the groove portion, from above the wire, may be further provided.

In the ninth aspect, the cover can protect the wire stored at the groove portion.

According to a tenth aspect based on the eighth aspect, the housing may include an opening portion provided at a front surface side of the housing, and a door portion for closing or opening the opening portion. The paper sheet processing device may further include a storage unit disposed in the housing for storing sheets. The storage unit may be drawable to outside of the housing through the opening portion when the door portion is opened. The groove portion may be disposed between the door portion and a storage position at which the storage unit is stored in the housing, in a drawing direction of the storage unit.

In the tenth aspect, the wire is stored at the groove portion disposed between the door portion and the storage position at which the storage unit is stored in the housing, in the direction in which the storage unit is drawn. Therefore, also in a case where the wire is wired so as to extend between the first side wall and the second side wall, the storage unit can be drawn through the opening portion to outside of the housing regardless of whether the wire is present or absent.

According to an eleventh aspect based on the tenth aspect, the hole may be disposed between the door portion and the storage unit located at the storage position, in the drawing direction of the storage unit.

In the eleventh aspect, the hole and the groove portion are collectively disposed between the door portion and the storage unit located at the storage position, in the direction in which the storage unit is drawn. Thus, also in a case where, for example, the wire is wired so as to extend between the first side wall and the second side wall, the wire stored at the groove portion can be easily wired so as to extend toward the hole.

According to a twelfth aspect based on the tenth aspect, each of the first side wall and the second side wall may have a guide for drawing the storage unit to outside of the housing through the opening portion. The wire may pass between a back side of the guide and an inner wall surface of each of the first side wall and the second side wall.

In the twelfth aspect, the wire passes between the inner wall surface of the first side wall or the second side wall and the back side of the guide. Therefore, an operation for drawing the storage unit may not be hindered due to a wiring state of the wire According to a thirteenth aspect based on the twelfth aspect, the hole may include a plurality of holes, and the plurality of holes may be spaced from each other in an up-down direction at at least one of the first side wall and the second side wall. The guide may be disposed between the holes at at least one of the first side wall and the second side wall.

In the thirteenth aspect, the wire can be extended to outside of the housing through either the hole disposed above the guide or the hole disposed below the guide without influencing an operation for drawing the storage unit.

According to a fourteenth aspect based on the tenth aspect, the first side wall and the second side wall may be disposed so as to face each other in a horizontal direction and a direction orthogonal to the drawing direction.

In the fourteenth aspect, the storage unit can be easily drawn through the opening portion to outside of the housing when the door portion is opened.

As described above, according to the present disclosure, wiring work efficiency can be enhanced regardless of an environment or a state in which the paper sheet processing device is installed.

Figure 2:
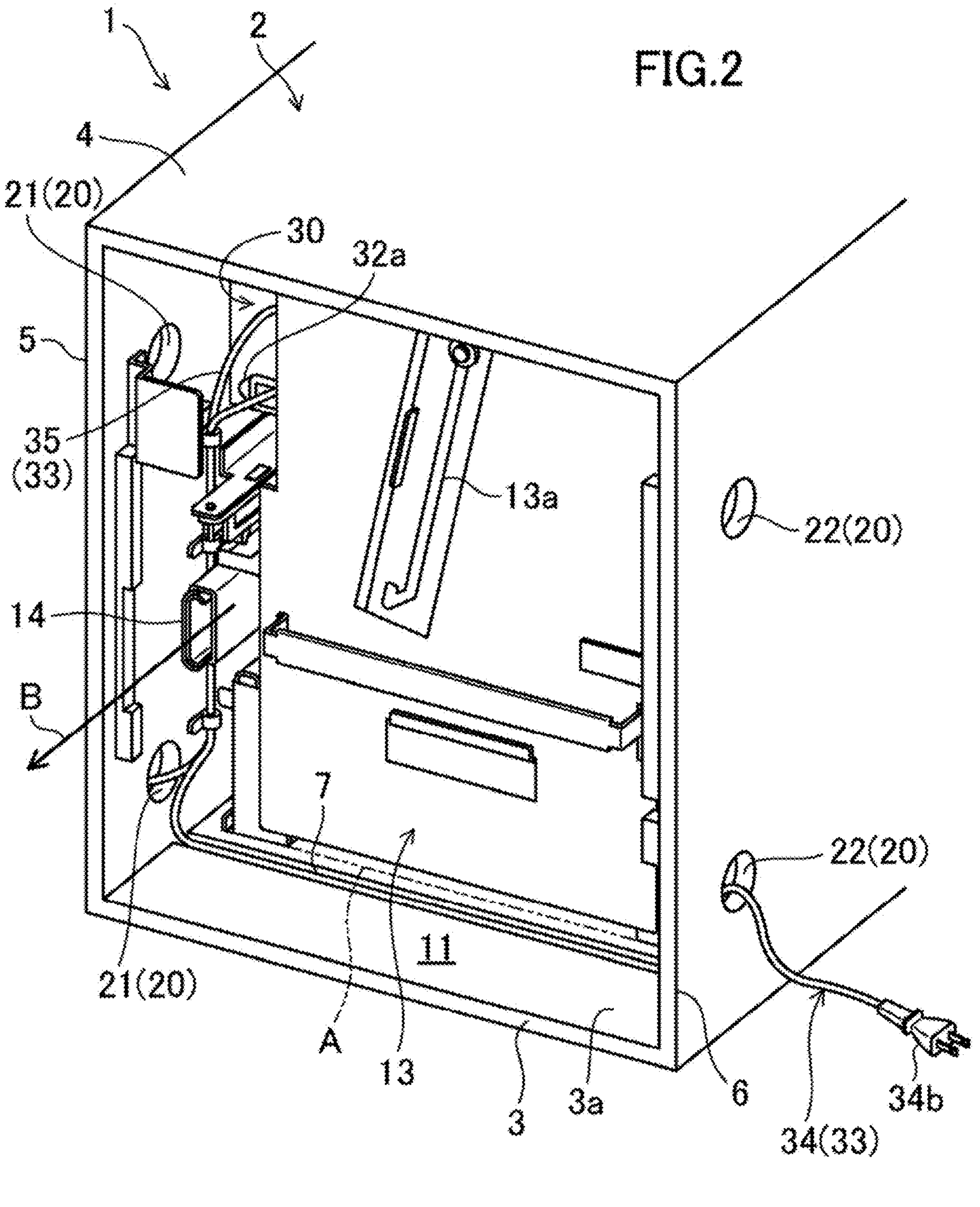
FIG. 2 is a perspective view of the paper sheet processing device according to the embodiment in a state where a cover, a door portion, and a cap are detached, as viewed from the front-right side.
Figure 3:
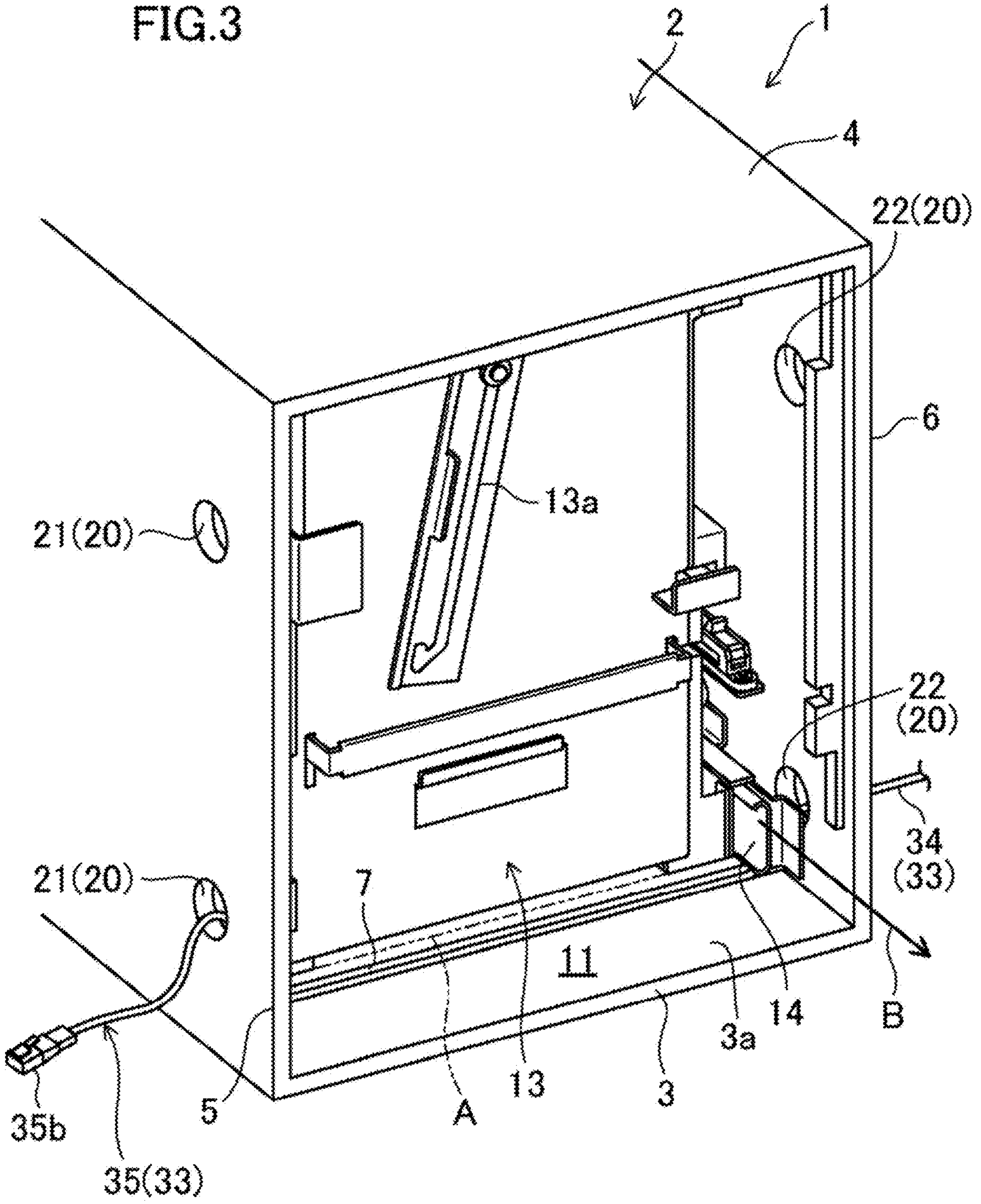
FIG. 3 is a perspective view of the paper sheet processing device according to the embodiment in a state where the cover, the door portion, and the cap are detached, as viewed from the front-left side.

FIG. 1 to FIG. 3 illustrate the entirety of a paper sheet processing device 1 according to an embodiment of the present disclosure. The paper sheet processing device 1 is used for handling sheets such as banknotes and valuable mediums. Specifically, the paper sheet processing device 1 is used as, for example, a banknote handling device. The banknote handling device is installed in, for example, financial facilities such as banks, and retail stores. The banknote handling device is configured to perform various processing including depositing and dispensing.

In the following description, the upper (upper side) and the lower (lower side) represent a positional relationship in the up-down direction in the paper sheet processing device 1 shown in FIG. 1, the front (front side) and the rear (rear side) represent a positional relationship in the front-rear direction in the paper sheet processing device 1 shown in FIG. 1, and the right side and the left side represent a positional relationship in the left-right direction in the paper sheet processing device 1 shown in FIG. 1.

(Housing)

As shown in FIG. 1 to FIG. 3, the paper sheet processing device 1 includes a housing 2. The housing 2 functions as a safe in which banknotes are stored. A display, a sheet inlet, and the like, which are not illustrated, are disposed on the housing 2. The housing 2 is, for example, substantially rectangular-parallelepiped-box-shaped. Specifically, the housing 2 has a bottom 3, a top portion 4, a first side wall 5, and a second side wall 6.

(Bottom and Top Portion)

The bottom 3 and the top portion 4 are disposed so as to face each other in the up-down direction. Each of the bottom 3 and the top portion 4 is substantially plate-shaped. The top portion 4 has an inlet/outlet opening **4*a* through which sheets such as banknotes and valuable mediums are fed in and withdrawn between a not-illustrated handling unit (handling unit: includes the display, the sheet inlet, and the like which are not illustrated) disposed above the paper sheet processing device 1, and a storage unit 13 described below. In a case where the paper sheet processing device 1 is used as a banknote handling device, each of the bottom 3 and the top portion 4** preferably has a thickness of, for example, 12.5 mm.

(Groove Portion)

Figure 4:
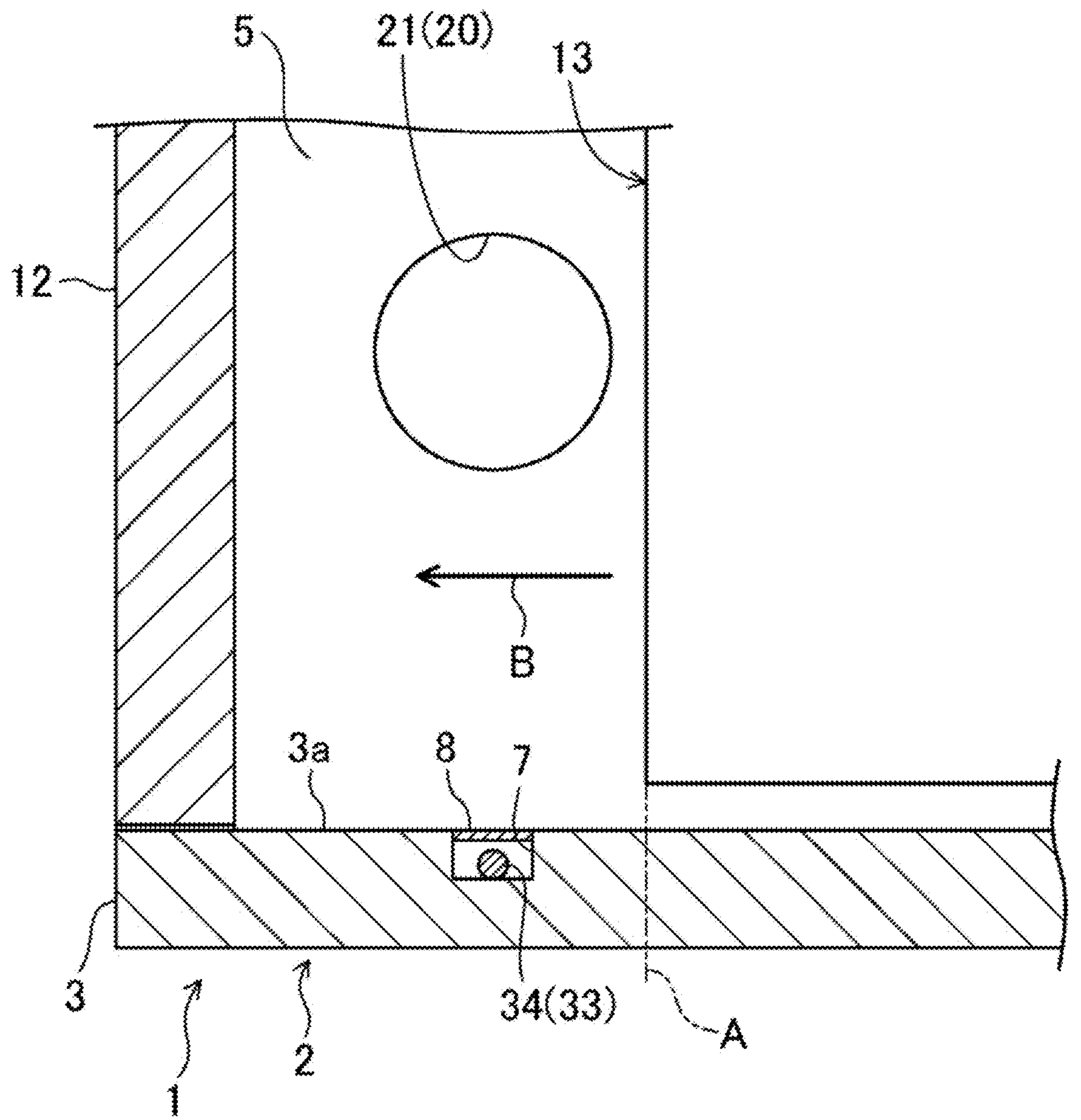
FIG. 4 is a cross-sectional view schematically illustrating a state, on a longitudinal cross-section, of a portion near a bottom of a housing between the door portion and a storage position of a storage unit.

As shown in FIG. 2 to FIG. 4, the bottom 3 has an inner bottom **3*a* facing the inside of the housing 2. As shown also in FIG. 5, the inner bottom 3*a* has a groove portion 7. The groove portion 7 is formed so as to extend between the first side wall 5 and the second side wall 6 in the left-right direction. The groove portion 7 is, for example, straight-line-shaped. The groove portion 7 is formed so as to be recessed downward from the inner bottom 3*a* of the bottom 3. The groove portion 7 is formed in a well-like shape as viewed in the direction in which the groove portion 7** extends. The groove portion 7 is disposed between a door portion 12 and a storage position A at which the storage unit 13 is stored in the housing 2, in a direction in which the storage unit 13 described below is drawn, that is, in an arrow B direction shown in FIG. 2 to FIG. 4.

(Cover)

Figure 5:
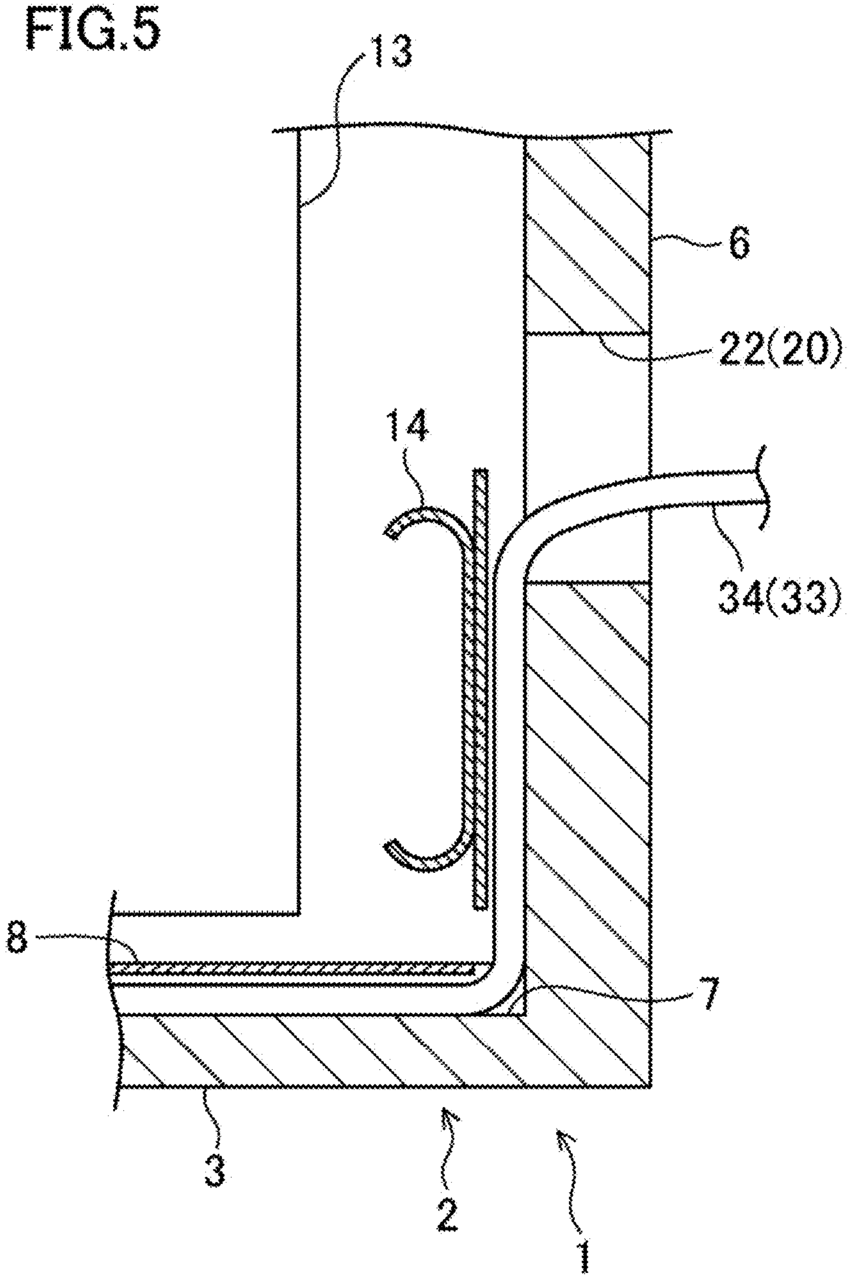
FIG. 5 is a cross-sectional view schematically illustrating a state, on a transverse cross-section, of a position including a groove portion and a second hole of a second side wall.

As shown in FIG. 4 and FIG. 5, the groove portion 7 may have a cover 8. The cover 8 is configured to cover a power supply line 34 (wire 33), described below, stored at the groove portion 7 from above the power supply line 34. In the present embodiment, the cover 8 is substantially plate-shaped in a cross-sectional view. The cover 8 is elongated in the left-right direction as compared with the front-rear direction. The cover 8 is mounted to the groove portion 7 such that the upper surface of the cover 8 is flush with the inner bottom 3*a* of the bottom 3. The left and the right end portions of the cover 8 are spaced from the inner wall surfaces of the first side wall 5 and the second side wall 6, respectively (see FIG. 5).

(First Side Wall and Second Side Wall)

As shown in FIG. 1 to FIG. 3, the first side wall 5 and the second side wall 6 are disposed so as to face each other in the horizontal direction and in the direction orthogonal to the direction in which the storage unit 13 described below is drawn. That is, in the present embodiment, the first side wall 5 and the second side wall 6 are disposed so as to face each other in the left-right direction.

A lower end portion of the first side wall 5 is connected to a left side end portion of the bottom 3 in the left-right direction. An upper end portion of the first side wall 5 is connected to a left side end portion of the top portion 4 in the left-right direction.

A lower end portion of the second side wall 6 is connected to a right side end portion of the bottom 3 in the left-right direction. An upper end portion of the second side wall 6 is connected to a right side end portion of the top portion 4 in the left-right direction.

Each of the first side wall 5 and the second side wall 6 is substantially plate-shaped. In a case where the paper sheet processing device 1 is used as a banknote handling device, each of the first side wall 5 and the second side wall 6 preferably has a thickness of, for example, 12.5 mm.

(Door Portion)

As shown in FIG. 2 and FIG. 3, an opening portion 11 is formed on the front surface side of the housing 2 so as to be surrounded by the bottom 3, the top portion 4, the first side wall 5, and the second side wall 6. In other words, the opening portion 11 is a front surface side end portion of the housing 2 in a frame surrounded by the bottom 3, the top portion 4, the first side wall 5, and the second side wall 6. As shown in FIG. 1 and FIG. 4, the door portion 12 is disposed on the front surface side of the housing 2 so as to close or open the opening portion 11. Specifically, the door portion 12 is configured to close or open the opening portion 11 by means of hinge portions 12*a* mounted to the first side wall 5.

(Storage Unit)

As shown in FIG. 2 to FIG. 5, the paper sheet processing device 1 includes the storage unit 13. The storage unit 13 is used for storing sheets such as banknotes. The storage unit 13 is disposed in the housing 2. The storage unit 13 is configured to be drawable through the opening portion 11 to outside of the housing 2 when the door portion 12 is opened. Specifically, the storage unit 13 is configured to be drawn forward from the housing 2 along the arrow B direction. A handle 13*a* for drawing the storage unit 13 is disposed on the front surface side of the storage unit 13.

(Guide)

As shown in FIG. 2 and FIG. 3, a guide 14 is disposed at each of the first side wall 5 and the second side wall 6. The guide 14 is used for drawing the storage unit 13 through the opening portion 11 to outside of the housing 2. Each guide 14 extends in the front-rear direction in the housing 2. Each guide 14 is rail-shaped. The guides 14 have back surfaces spaced from inner wall surfaces of the first side wall 5 and the second side wall 6, respectively (see FIG. 5). In other words, the rail 14 on the first side wall 5 side is spaced from the first side wall 5 and the rail 14 on the second side wall 6 side is spaced from the second side wall 6.

As shown in FIG. 2, the guide 14 located at the first side wall 5 is disposed between two first holes 21 (described below) aligned in the up-down direction. As shown in FIG. 3 and FIG. 5, the guide 14 located at the second side wall 6 is disposed below a second hole 22 located on the lower side of the second side wall 6 in the up-down direction.

(Hole)

As shown in FIG. 1 to FIG. 3, the first side wall 5 and the second side wall 6 have a plurality of holes 20. Each hole 20 is configured so as to extend a second end of each wire 33 described below from inside of the housing 2 to outside of the housing 2. In the present embodiment, a plurality of the holes 20 are disposed. More specifically, the holes 20 include a plurality (two in the illustrated example) of the first holes 21 and a plurality (two in the illustrated example) of the second holes 22.

As shown in FIG. 2 to FIG. 4, the first holes 21 are disposed at the first side wall 5. Each of the first holes 21 penetrates through the first side wall 5 from inside of the housing 2 toward outside of the housing 2. Each of the first holes 21 has a round shape. The shape of the first hole 21 is not limited to a round shape, and may be, for example, an ellipsoidal shape, a triangular shape, or a quadrangular shape.

The first holes 21 are spaced from each other in the up-down direction. The first holes 21 are disposed between the door portion 12 and the storage unit 13 located at the storage position A, in the direction in which the storage unit 13 is drawn.

As shown in FIG. 2 and FIG. 3, the second holes 22 are disposed at the second side wall 6. Similarly to the first holes 21, each of the second holes 22 penetrates through the second side wall 6 from inside of the housing 2 toward outside of the housing 2 (see FIG. 5). Each of the second holes 22 has a round shape. The shape of the second hole 22 is not limited to a round shape, and may be, for example, an ellipsoidal shape, a triangular shape, or a quadrangular shape.

The second holes 22 are spaced from each other in the up-down direction. The second holes 22 are disposed between the door portion 12 and the storage unit 13 located at the storage position A, in the direction in which the storage unit 13 is drawn.

(Cap)

As shown in FIG. 1 to FIG. 3, the paper sheet processing device 1 includes a cap 23. The cap 23 is used for closing each hole 20 through which the wire 33 described below does not pass. A plurality of the caps 23 may be disposed. In the present embodiment, the cap 23 is mounted to the first hole 21 disposed on the upper side of the first side wall 5. The cap 23 is mounted also to the second hole 22 disposed on the upper side of the second side wall 6.

(Control Device and Control Board)

As shown in FIG. 2, the paper sheet processing device 1 includes a control device 30. Specifically, the control device 30 is implemented as a computer. The control device 30 is disposed in the housing 2. Specifically, the control device 30 is disposed on the upper side in the housing 2. The control device 30 is disposed between the first side wall 5 and the storage unit 13 in the left-right direction.

Figure 6:
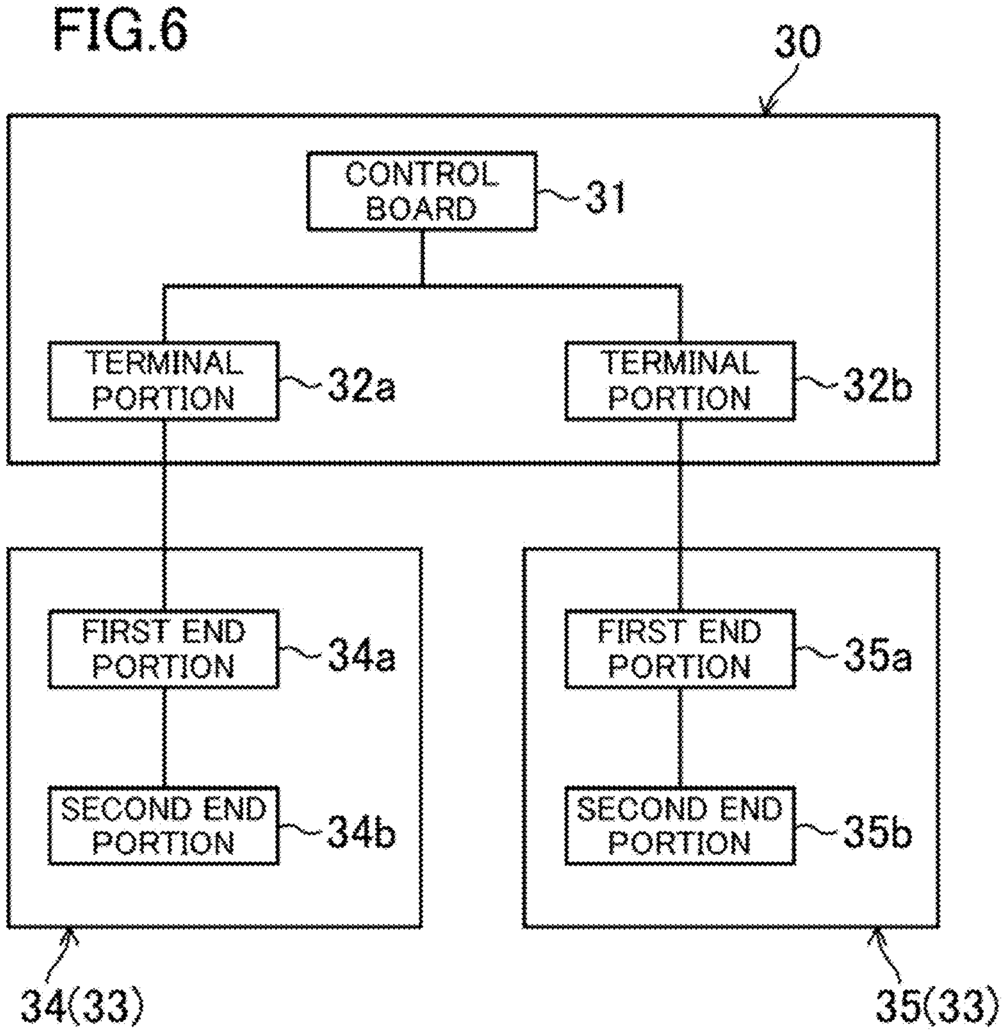
FIG. 6 is a block diagram illustrating a functional configuration between a control device and each of a power supply line and a communication line.

As shown in FIG. 6, the control device 30 has a control board 31. The control board 31 is used for controlling the operation of the paper sheet processing device 1. Specifically, the control board 31 has a control program incorporated mainly for controlling the operation of the storage unit 13.

Figure 7:
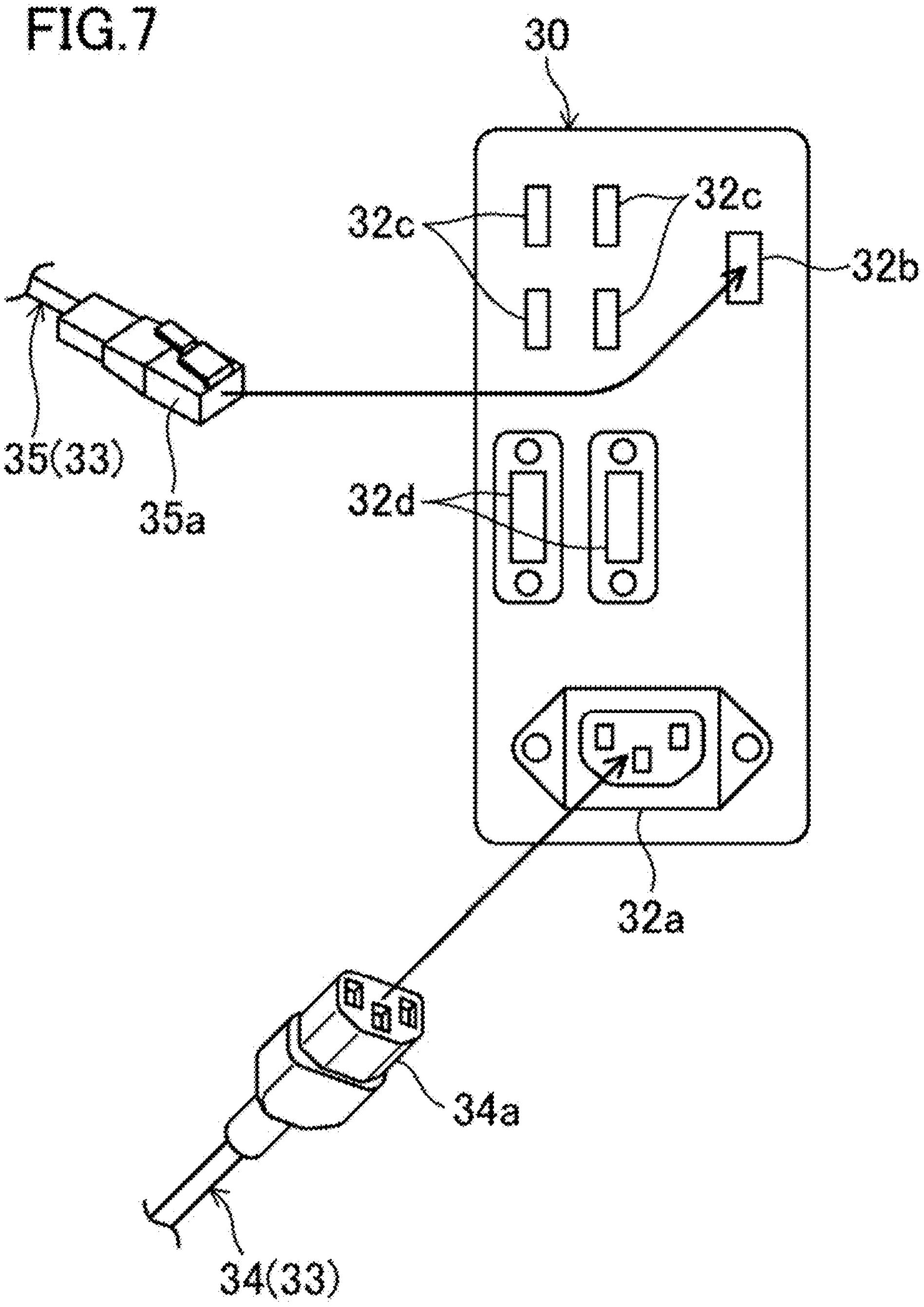
FIG. 7 is a schematic diagram schematically illustrating a connection relationship between terminal portions of the control device and first ends of wires.

As shown in FIG. 7, the control device 30 has terminal portions 32*a* to 32*d* for connection of each of the wires 33 described below. Each of the terminal portions 32*a* to 32*d* is electrically connected to the control board 31. The terminal portions 32*a* to 32*d* are disposed on the front surface side of the control device 30.

The terminal portion 32*a* is configured to connect the power supply line 34 described below. Each of the terminal portions 32*b* to 32*d* is configured to connect a communication line 35 described below. Specifically, the terminal portion 32*b* is used for connection of a LAN (local area network). The terminal portion 32*c* is used for connection of a USB (universal serial bus). The terminal portion 32*d* is used for connection to a display device as an external device.

(Wire)

As shown in FIG. 2 and FIG. 3, the paper sheet processing device 1 includes the wire 33. One wire 33 or a plurality of the wires 33 may be disposed. Each of the wires 33 has electric conductivity. Each of the wires 33 is used for carrying electric current or a signal. As shown in FIG. 6 and FIG. 7, the wire 33 is implemented as a wire (the power supply line 34, the communication line 35) depending on the usage.

The power supply line 34 has a first end 34*a*. The power supply line 34 is configured such that the first end 34*a* is electrically connected to the control board 31 via the terminal portion 32*a*.

The power supply line 34 has a second end 34*b*. The power supply line 34 is configured such that the second end 34*b* is electrically connected to, for example, a power receptacle (not shown) disposed outside the paper sheet processing device 1.

As shown in FIG. 2, the power supply line 34 passes between the inner wall surface of the first side wall 5 and the back side of the guide 14. As shown also in FIG. 3, the power supply line 34 is disposed so as to be stored at the groove portion 7. The power supply line 34 is wired so as to extend from the first side wall 5 toward the second side wall 6 in the left-right direction in a state where the power supply line 34 is stored at the groove portion 7. As shown in FIG. 3 and FIG. 5, the power supply line 34 passes between the inner wall surface of the second side wall 6 and the back side of the guide 14. The second end 34*b* of the power supply line 34 is extended to outside of the housing 2 through the second hole 22 disposed on the lower side of the second side wall 6.

Next, as shown in FIG. 6 and FIG. 7, in the present embodiment, the communication line 35 is illustrated as a LAN cable. The communication line 35 is not limited to the LAN cable, and may be implemented as a communication line as a USB cable or a communication line for connection to a display device as an external device.

The communication line 35 has a first end 35*a*. The communication line 35 is configured such that the first end 35*a* is electrically connected to the control board 31 via the terminal portion 32 of the control device 30.

The communication line 35 has a second end 35*b*. The communication line 35 is configured such that the second end 35*b* is electrically connected to an external device (not shown) disposed outside the paper sheet processing device 1.

As shown in FIG. 2, the communication line 35 passes between the inner wall surface of the first side wall 5 and the back side of the guide 14. The second end 35*b* of the communication line 35 is extended to outside of the housing 2 through the first hole 21 disposed on the lower side of the first side wall 5. That is, the second end 35*b* of the communication line 35 is extended to outside of the housing 2 through the first hole 21 through which the power supply line 34 does not pass.

Effect of the Embodiment

As described above, in the paper sheet processing device 1, the second end of each wire 33 connected to the control board 31 can be extended from the side surface of the housing 2 to outside of the housing 2 through the hole 20 disposed at at least one of the first side wall 5 and the second side wall 6. Therefore, in a case where, for example, the paper sheet processing device 1 is installed in a state where a gap is very small between the back surface of the housing 2 and a wall surface of a room in a building, the second end of the wire 33 is easily extended from the side surface of the housing 2 to outside of the housing 2 through the hole 20. Furthermore, also in a case where, for example, the paper sheet processing device 1 is installed under a desk in a state where a working space under the desk is very small, since the second end of the wire 33 is extended from the side surface of the housing 2 to outside of the housing 2, the wiring work is facilitated. Furthermore, also in a case where, for example, another wire 33 is additionally wired in order to additionally dispose an external device during maintenance after the paper sheet processing device 1 has been installed, since at least one option for extending the second end of the wire 33 to outside of the device is provided, the wiring work and a work for adding the external device are facilitated. Therefore, in the paper sheet processing device 1, the wiring work efficiency can be enhanced regardless of an environment or a state in which the paper sheet processing device 1 is installed.

The second end 34*b* of the power supply line 34 and the second end 35*b* of the communication line 35 are each extended through any of the first holes 21 and the second holes 22 to outside of the housing 2. Thus, in the paper sheet processing device 1, a plurality of options for extending each of the second end 34*b* of the power supply line 34 and the second end 35*b* of the communication line 35 to outside of the device are provided. Therefore, the wiring work efficiency can be further enhanced regardless of an environment or a state in which the paper sheet processing device 1 is installed.

In the present embodiment, the second end 34*b* of the power supply line 34 is extended to outside of the housing 2 through the second hole 22. The second end 35*b* of the communication line 35 is extended to outside of the housing 2 through the first hole 21 through which the power supply line 34 does not pass. That is, the second end 34*b* of the power supply line 34 and the second end 35*b* of the communication line 35 are extended to outside of the housing 2 through the second hole 22 and the first hole 21, respectively, in a separated state. Thus, the power supply line 34 and the communication line 35 can be wired so as to be separated from each other. As a result, the power supply line 34 and the communication line 35 are unlikely to exert electrical influence on each other, thereby inhibiting noise from causing communication error or the like.

The hole 20 through which the wire 33 does not pass is closed by the cap 23, whereby the housing 2 can be nearly sealed. Thus, a stored state of sheets in the housing 2 can be maintained good. In a case where the hole 20 through which the wire 33 does not pass is closed by the cap 23, degradation in the design of the outer appearance of the paper sheet processing device 1 can be prevented.

In the paper sheet processing device 1, since the wire 33 is disposed so as to be stored at the groove portion 7, also in a case where the wire 33 is wired so as to extend between the first side wall 5 and the second side wall 6, the wire 33 can be stored neatly in the housing 2.

In the paper sheet processing device 1, the cover 8 can protect the wire 33 stored at the groove portion 7.

The wire 33 is stored at the groove portion 7 disposed between the door portion 12 and the storage position A at which the storage unit 13 is stored in the housing 2, in the direction in which the storage unit 13 is drawn. Therefore, also in a case where the wire 33 is wired so as to extend between the first side wall 5 and the second side wall 6, the storage unit 13 can be drawn through the opening portion 11 to outside of the housing 2 regardless of whether the wire 33 is present or absent.

The plurality of holes 20 are disposed between the door portion 12 and the storage unit 13 located at the storage position A, in the direction in which the storage unit 13 is drawn. That is, the plurality of holes 20 and the groove portion 7 are collectively disposed between the door portion 12 and the storage unit 13 located at the storage position A, in the direction in which the storage unit 13 is drawn. Thus, also in a case where the power supply line 34 is wired so as to extend between the first side wall 5 and the second side wall 6 as in the present embodiment, the power supply line 34 stored at the groove portion 7 can be easily wired so as to extend toward the second hole 22.

Each wire 33 passes between the inner wall surface of the first side wall 5 or the second side wall 6 and the back side of the guide 14. Therefore, an operation for drawing the storage unit 13 may not be inhibited due to a wiring state of each wire 33.

The guide 14 located at the first side wall 5 is disposed between the two first holes 21 aligned with each other in the up-down direction. Thus, each of the wires 33 can be extended to outside of the housing 2 through either the first hole 21 disposed above the guide 14 or the first hole 21 disposed below the guide 14 without influencing an operation for drawing the storage unit 13.

The first side wall 5 and the second side wall 6 are disposed so as to face each other in the horizontal direction and in the direction orthogonal to the drawing direction. Thus, in the paper sheet processing device 1, the storage unit 13 can be easily drawn through the opening portion 11 to outside of the housing 2 when the door portion 12 is opened.

Modification 1 of the Embodiment

In the above-described embodiment, the second end 34*b* of the power supply line 34 is extended to outside of the housing 2 through the second hole 22. However, the present disclosure is not limited to this configuration.

Figure 8:
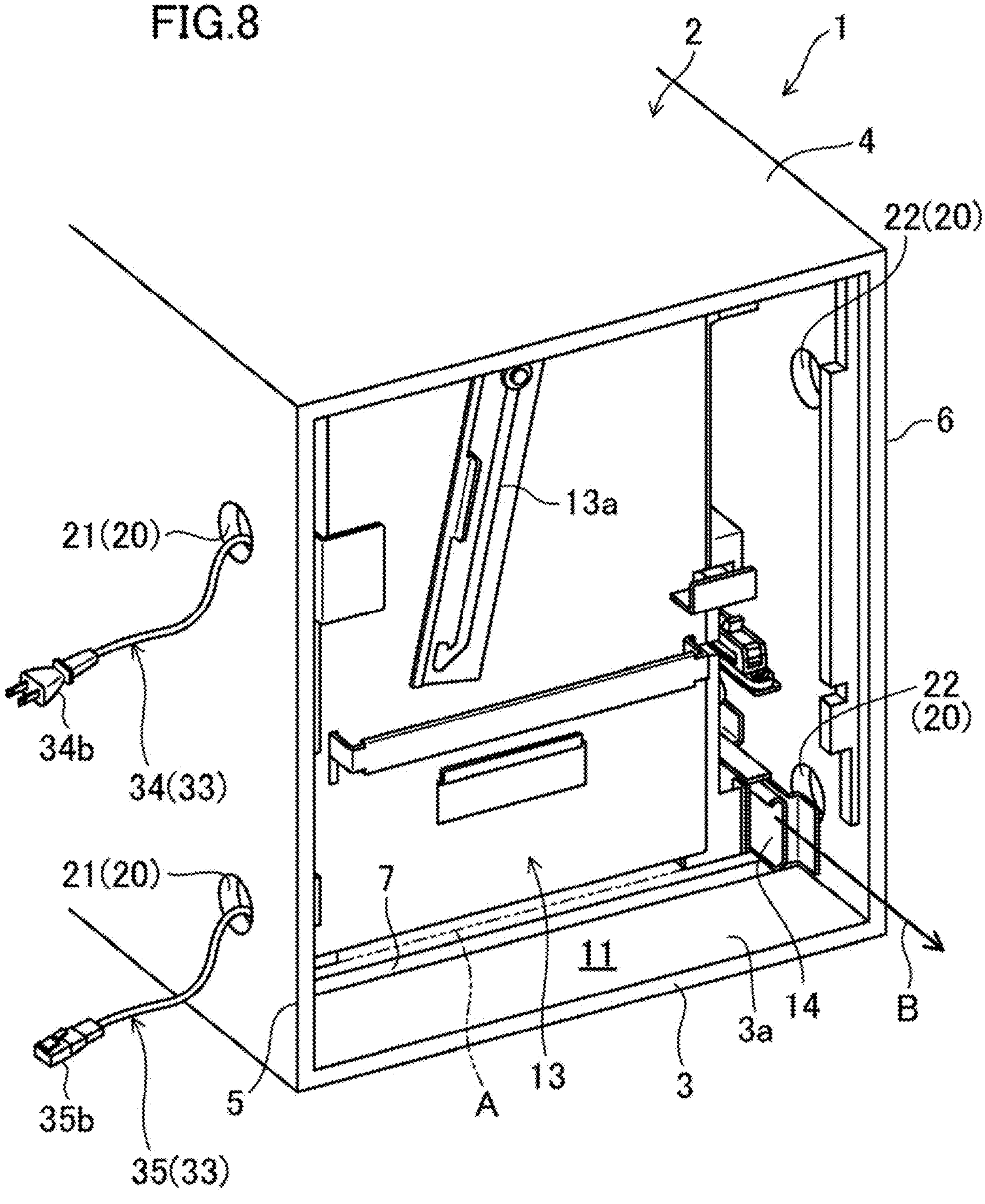
FIG. 8 is a diagram corresponding to FIG. 3 and illustrating modification 1 of the paper sheet processing device according to the embodiment.

For example, as in modification 1 shown in FIG. 8. the second end 34*b* of the power supply line 34 may be extended to outside of the housing 2 through the first hole 21 disposed on the upper side of the first side wall 5. That is, the second end of the communication line 35 is extended to outside of the housing 2 through the first hole 21 through which the power supply line 34 does not pass.

In modification 1, each of the second end 34*b* of the power supply line 34 and the second end 35*b* of the communication line 35 is extended to outside of the housing 2 through one of the two first holes 21. That is, also in this modification, as in the above-described embodiment, a plurality of options for extending each of the second end 34*b* of the power supply line 34 and the second end 35*b* of the communication line 35 to outside of the device are provided. Since the two first holes 21 are spaced from each other in the up-down direction of the first side wall 5, the second end 34*b* of the power supply line 34 and the second end 35*b* of the communication line 35 can be extended to outside of the housing 2 through the first holes 21, respectively, in a separated state.

Therefore, also in the configuration as described in modification 1, similarly to the above-described embodiment, the power supply line 34 and the communication line 35 are unlikely to exert electrical influence on each other, thereby inhibiting noise from causing communication error or the like.

Modification 2 of the Embodiment

In the above-described embodiment, the second end 35*b* of the communication line 35 is extended to outside of the housing 2 through the first hole 21 disposed on the lower side of the first side wall 5. However, the present disclosure is not limited to this configuration.

Figure 9:
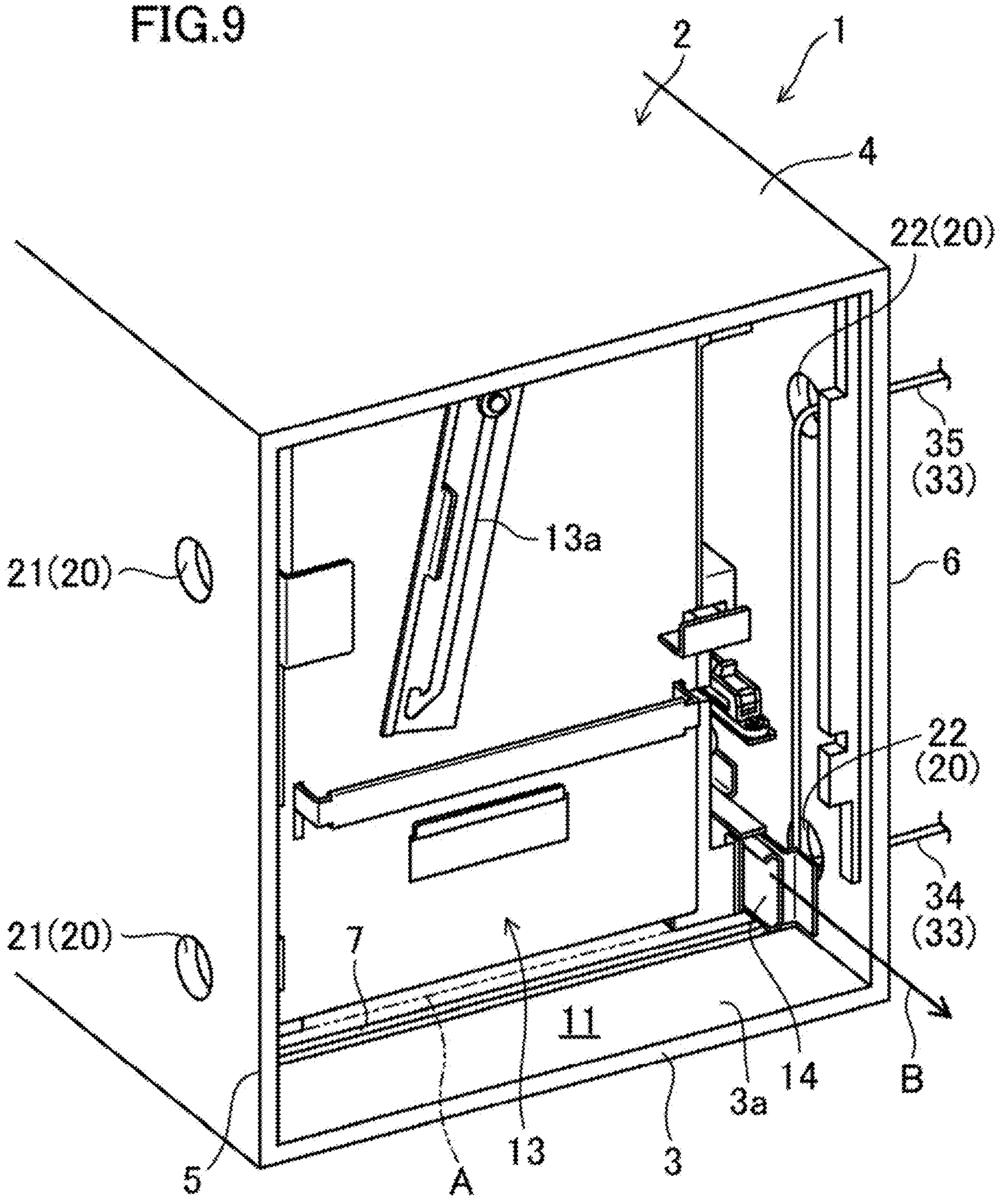
FIG. 9 is a diagram corresponding to FIG. 3 and illustrating modification 2 of the paper sheet processing device according to the embodiment.
Figure 10:
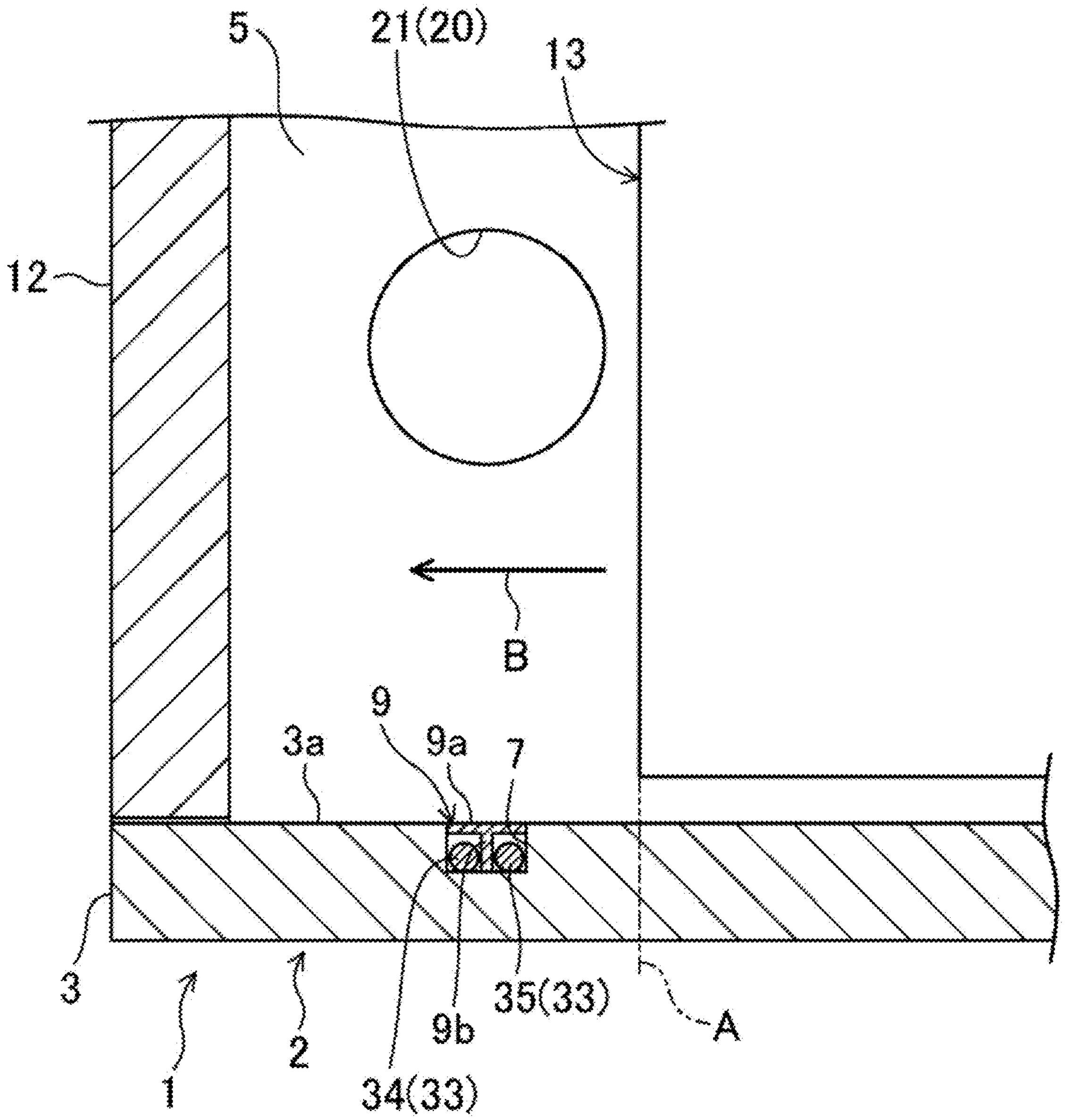
FIG. 10 is a diagram corresponding to FIG. 4 and illustrating modification 2 of the paper sheet processing device according to the embodiment.

For example, as in modification 2 shown in FIG. 9 and FIG. 10, the second end 35*b* of the communication line 35 may be extended to outside of the housing 2 through the second hole 22 disposed on the upper side of the second side wall 6. That is, the second end 35*b* of the communication line 35 is extended to outside of the housing 2 through the second hole 22 through which the power supply line 34 does not pass.

In modification 2, the second end 34*b* of the power supply line 34 and the second end 35*b* of the communication line 35 are each extended to outside of the housing 2 through one of the two second holes 22. That is, also in this modification, as in the above-described embodiment, a plurality of options for extending each of the second end 34*b* of the power supply line 34 and the second end 35*b* of the communication line 35 to outside of the device are provided. Since the two second holes 22 are spaced from each other in the up-down direction of the second side wall 6, the second end 34*b* of the power supply line 34 and the second end 35*b* of the communication line 35 can be extended to outside of the housing 2 through the second holes 22, respectively, in a separated state.

Furthermore, in modification 2, instead of the cover 8 of the above-described embodiment, a cover 9 having a shape partially different from that of the cover 8 is used. The cover 9 is substantially T-shaped in a cross-sectional view. Specifically, the cover 9 has a plate portion 9*a*, and a separation wall portion 9*b* projecting downward from almost the center of the plate portion 9*a*. By the separation wall portion 9*b* of the cover 9, the power supply line 34 and the communication line 35 can be stored at the groove portion 7 so as to be separated from each other in the groove portion 7.

Therefore, also in the configuration as described in modification 2, the power supply line 34 and the communication line 35 are unlikely to exert electrical influence on each other, thereby inhibiting noise from causing communication error or the like.

Modification 3 of the Embodiment

In the above-described embodiment, the second end 35*b* of the communication line 35 is extended to outside of the housing 2 through the first hole 21 through which the power supply line 34 does not pass. However, the present disclosure is not limited to this configuration. That is, the second end 35*b* of the communication line 35 may be extended to outside of the housing 2 through the first hole 21 or the second hole 22 through which the power supply line 34 passes.

Figure 11:
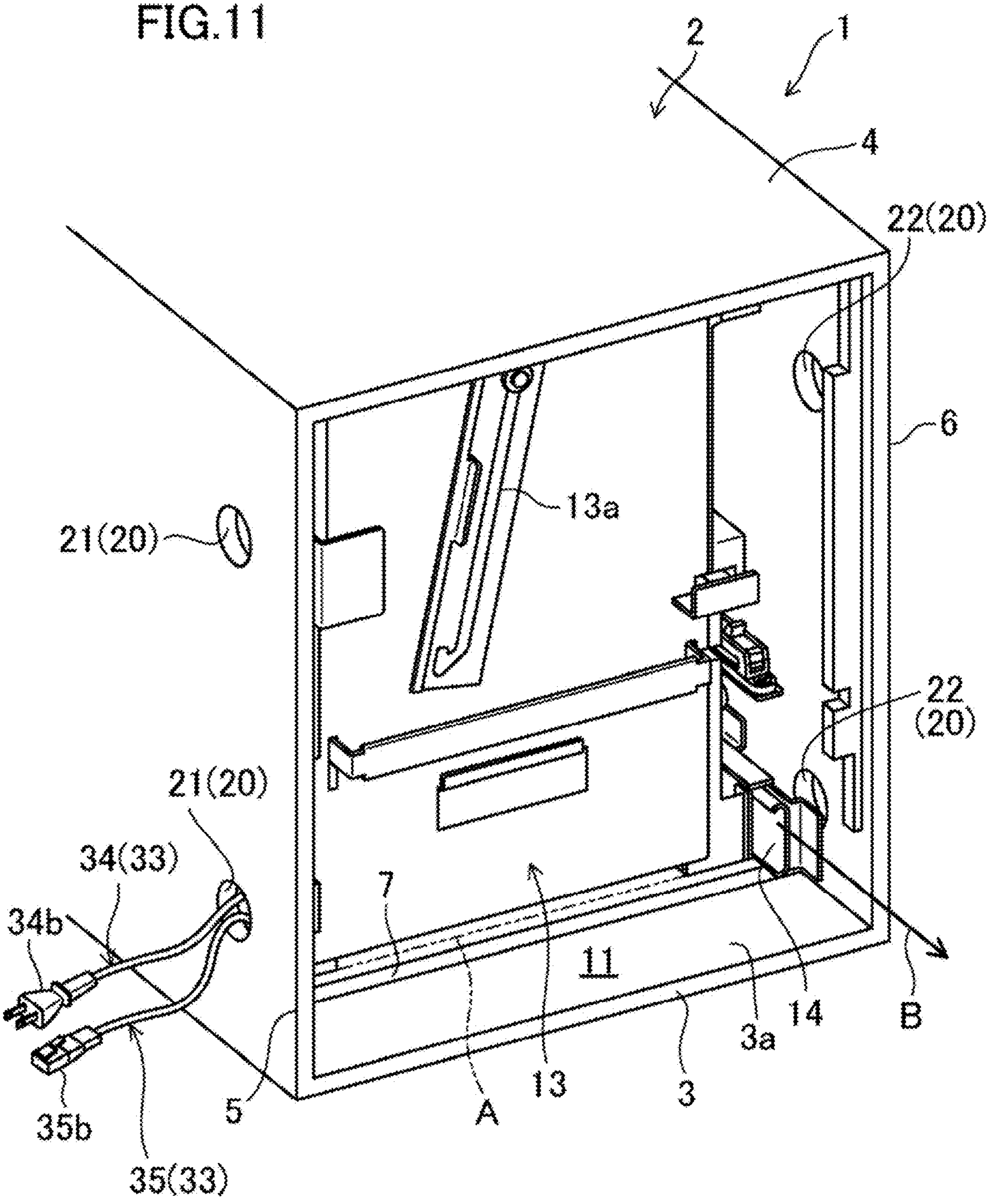
FIG. 11 is a diagram corresponding to FIG. 3 and illustrating modification 3 of the paper sheet processing device according to the embodiment.

For example, as in modification 3 shown in FIG. 11, each of the second end 34*b* of the power supply line 34 and the second end 35*b* of the communication line 35 may be extended to outside of the housing 2 through the first hole 21 disposed on the lower side of the first side wall 5. In such a configuration, the power supply line 34 and the communication line 35 connected to the control board 31 can be collected into one and extended to outside of the housing 2 through the first hole 21. Thus, the wiring work for the power supply line 34 and the communication line 35 can be simplified.

Other Embodiments

In the above-described embodiment, the guide 14 located at the second side wall 6 is disposed below the second hole 22 located on the lower side of the second side wall 6 in the up-down direction. However, the present disclosure is not limited to this configuration. That is, the guide 14 located at the second side wall 6 may be disposed between the two second holes 22 aligned with each other in the up-down direction in the second side wall 6. Thus, the wire 33 can be extended to outside of the housing 2 through one of the second hole 22 disposed above the guide 14 or the second hole 22 disposed below the guide 14 without influencing an operation for drawing the storage unit 13.

In the above-described embodiment, the number of the communication lines 35 provided is one. However, the present disclosure is not limited to this configuration. That is, a plurality of the communication lines 35 may be provided.

The present disclosure has been described above based on the embodiments. However, the present disclosure is not limited to the above-described embodiments, and various modifications can be made in the scope of the present disclosure.

The present disclosure can be industrially used as a paper sheet processing device for handling sheets such as banknotes and valuable mediums.

What is claimed is:

1. A paper sheet processing device comprising:
a housing of the paper sheet processing device;
a control board disposed in the housing for controlling an operation of the paper sheet processing device;
at least one conductive wire having a first end connected to the control board; and
a storage disposed in the housing and configured to store paper sheets, wherein
the housing includes
a bottom,
a top facing the bottom,
a first side wall and a second side wall connected to both ends of the bottom and to both ends of the top,
an opening provided at a front surface side of the housing, and
a door for closing or opening the opening,
at least one hole is provided at at least one of the first side wall and the second side wall so as to penetrate therethrough from inside of the housing to outside of the housing,
the hole allows a second end of the wire to extend from inside of the housing to outside of the housing,
the storage is drawable to outside of the housing through the opening in a drawing direction when the door is opened,
the hole is disposed, in the drawing direction, between the door and the storage located at a storage position, the storage position indicating where the storage is stored in the drawing direction of the storage,
the bottom has an inner bottom facing inside of the housing,
the inner bottom has a groove extending between and connecting the first side wall and the second side wall,
the groove is disposed between the door and the storage position, in the drawing direction of the storage, and
the wire is disposed so as to be stored in the groove and located below the storage, in both a case in which the storage is located at the storage position and a case in which the storage is drawn away from the storage position.

2. The paper sheet processing device according to claim 1, wherein
the hole includes
at least one first hole disposed at the first side wall, and
at least one second hole disposed at the second side wall,
the wire includes a power supply line having a first end connected to the control board,
the wire includes a communication line having a first end connected to the control board,
a second end of the power supply line is extended to outside of the housing through one of the at least one first hole and the at least one second hole, and
a second end of the communication line is extended to outside of the housing through one of the at least one first hole and the at least one second hole.

3. The paper sheet processing device according to claim 2, wherein
the second end of the power supply line is extended to outside of the housing through one of the at least one first hole and the at least one second hole, and
the second end of the communication line is extended to outside of the housing through the first hole or the second hole through which the power supply line passes.

4. The paper sheet processing device according to claim 2, wherein
the second end of the power supply line is extended to outside of the housing through one of the at least one first hole and the at least one second hole,
the communication line is configured such that the second end thereof is extended to be electrically connected to an external device disposed outside of the paper sheet processing device, and
the second end of the communication line is extended to outside of the housing through the first hole or the second hole through which the power supply line does not pass.

5. The paper sheet processing device according to claim 2, wherein the first hole comprises a plurality of first holes, and the plurality of first holes are spaced from each other in an up-down direction of the first side wall.

6. The paper sheet processing device according to claim 5, wherein the second hole comprises a plurality of second holes, and the plurality of second holes are spaced from each other in an up-down direction of the second side wall.

7. The paper sheet processing device according to claim 1, further comprising a cap for closing the hole through which the wire does not pass, among the holes disposed at at least one of the first side wall and the second side wall.

8. The paper sheet processing device according to claim 1, further comprising a cover for covering the wire stored at the groove, from above the wire.

9. The paper sheet processing device according to claim 1, wherein each of the first side wall and the second side wall has a guide for drawing the storage to outside of the housing through the opening, and the wire passes between a back side of the guide and an inner wall surface of each of the first side wall and the second side wall.

10. The paper sheet processing device according to claim 9, wherein the hole comprises a plurality of holes, and the plurality of holes are spaced from each other in an up-down direction at at least one of the first side wall and the second side wall, and the guide is disposed between the holes at at least one of the first side wall and the second side wall.

11. The paper sheet processing device according to claim 1, wherein the first side wall and the second side wall are disposed so as to face each other in a horizontal direction and a direction orthogonal to the drawing direction.

* * * * *